United States Patent [19]
McCarthy

[11] 4,456,705
[45] Jun. 26, 1984

[54] HEAT FUSIBLE-EXPANDABLE MASTIC FOR AUTOMOBILE FLOOR PANS

[75] Inventor: Bruce C. McCarthy, Newburyport, Mass.

[73] Assignee: USM Corporation, Farmington, Conn.

[21] Appl. No.: 336,091

[22] Filed: Dec. 31, 1981

[51] Int. Cl.³ .............................................. C08J 9/00
[52] U.S. Cl. ..................................... 521/83; 428/355; 521/92; 521/134; 521/140; 521/98
[58] Field of Search ............... 521/83, 84, 92, 134, 521/140

[56] References Cited

U.S. PATENT DOCUMENTS

| | | | |
|---|---|---|---|
| 2,981,361 | 4/1961 | Schofield | 521/83 |
| 3,725,315 | 4/1973 | Bauer | 521/83 |
| 4,010,123 | 3/1977 | Blunt et al. | 521/83 |

FOREIGN PATENT DOCUMENTS 997085   9/1976   Canada.

*Primary Examiner*—Morton Foelak
*Attorney, Agent, or Firm*—John P. Morley

[57] ABSTRACT

The invention relates to a relatively inexpensive, non-blocking, low density sound deadening mastic material. Essentially, the composition of the improved sound deadening mastic material of this invention includes a mineral filler, an elastomer, a polymeric modifier and a foaming (or blowing) agent. The mastic material is particularly useful in sheet form for automotive applications.

11 Claims, 4 Drawing Figures

HEAT FUSIBLE-EXPANDABLE MASTIC FOR AUTOMOBILE FLOOR PANS

BACKGROUND OF THE INVENTION

1. Field of the Invention

This invention relates to asphaltic based mastic materials particularly useful in vibration damping applications.

2. Description of the Prior Art

Important reductions in automobile noise level have been achieved by vibration damping of automobile floor panels, door panels, and roof panel sections. Compositions containing fillers dispersed in binders have been widely used to coat such metal surfaces to provide the desired sound deadening. For example, sheet materaials of heat softenable compositions including asphalt, fillers and natural and/or synthetic elastomers have been used in this application. Heat softenable sheet materials of this type are described in detail in U.S. Pat. No. 4,133,932, Australian Pat. No. 498,074 and Canadian Pat. No. 997,085.

Sheet materials as described above are presently used in the automotive industry for sound deadening of metal floor panel sections. Essentially, the sheet material is placed on the floor panel section before the automobile body goes through the heating ovens for drying the paint finish. In response to the temperatures of the oven, the sheet material softens (or wilts) into conformity with the contour of the floor panel section and adheres to the metal surface.

The automotive industry has established tests for acceptable sound deadening sheet materials. These tests require that the sheet materials soften into conformity with the contours of the panel section surface at the paint oven temperatures and provide a strong bond to the metal surface. At the same time, the softening of the sheet material must be controlled or restrained so that flowing or running of the thermoplastic material not exceed an established value at the oven temperatures or at higher temperatures. Particularly desired sound deadening sheet materials for floor panel sections are those having the capability of bonding directly to the metal surface without the need of applying adhesive layers to the metal and/or the sheet material surfaces.

Another desirable performance characteristic of sound deadening sheet materials is that they be nonblocking or not stick together when stored in layers. The non-blocking feature permits the sheet materials to be stacked together during storage and transportation without the use of a release sheet between adjacent sheets. Sound deadening sheet materials requiring release sheets impose obvious disadvantages for an assembly line operation in terms of time, labor and costs.

More recently, the automotive industry has been especially concerned with weight reduction in order to improve fuel efficiency. To this end, expandable or foamed, non-asphaltic, sound deadening sheet materials of reduced density have been considered. However, proposed foamed sound deadening sheet materials are relatively expensive and sound deadening sheet materials have been traditionally assigned a low cost status in the automotive industry. The increased expense is due primarily to the high concentration of polymer in the sheet material required to provide a foamed sheet material of acceptable functional integrity. An acceptable foamed sound deadening sheet material must provide a cellular structure which is sufficiently strong and resilient to sustain continuously applied pressures without breaking or permanently collapsing.

A proposed bitumen containing foamable sound deadening material is described in German Ausligeschrift No. 2,824,681. The material is described as a nonself supporting mass foamable to the porous foamed structure comprising bitumen. Apparently the described material is designed to flow or run at elevated temperatures since the material is applied in the form of a foil 23 mm thick, reduced to a thickness of 11.5 mm presumably by flowing and then expanded or foamed to provide a porous structure. Additionally, the Example describes the foamable mass as containing about 25 percent by weight bitumen mixed with about 75 percent by weight mineral filler and a heat activatable adhesive is used to bond the mass to the metal.

The present invention is directed to the problem of providing a relatively inexpensive sound deadening sheet material which meets the desired flow characteristics at elevated temperatures, has the desirable surface adherent capability but is nonblocking and most importantly, can be expanded to provide a cellular structure of desirable and acceptable strength and integrity.

SUMMARY OF THE INVENTION

The present invention provides a relatively inexpensive, nonblocking, low density sound deadening sheet material. Essentially, the composition of the improved sound deadening sheet material of this invention includes a mineral filler, an elastomer, a polymeric modifier and a foaming (or blowing) agent.

The sheet materials of this invention are highly filled, expandable mastic materials which meet the requirements of the automotive industry in terms of temperature dependent softening, restrained flow characteristics and effective adhesion. In use, the improved sheet materials may be applied for example, to an automobile floor panel section in the conventional manner. When heated in the oven, the sheet material softens into conformity with the contours of the metal surface with flowing or running characteristics of the heated material restrained within the established limits. At the same time, the softened sheet material is expanded or foamed to provide a final sound deadening sheet having a strong, compressible and resilient cellular structure firmly bonded to the metal surface.

THE DRAWINGS

DETAILED DESCRIPTION OF THE INVENTION

Figure 1:
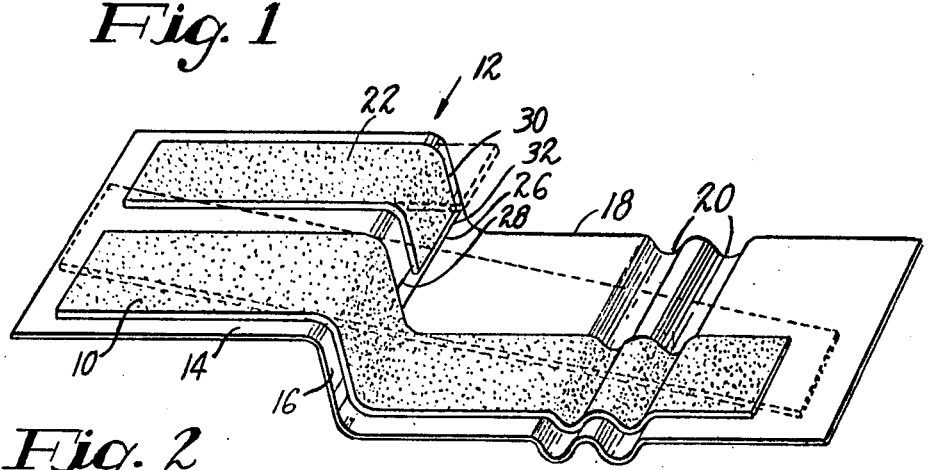
FIG. 1 is an angular elevational view of a contoured metal sheet used for testing thermal properties of sound deadening sheet materials.

The novel sound deadening sheet materials essentially comprise a dispersion of mineral or inorganic filler and elastomer in a binder system including asphalt and a polymeric modifier and a foaming or blowing agent. The composition and percent by weight of ingredients of sheet materials of this invention are set forth in Table I below:

TABLE I

|  | Range | Preferred |
| --- | --- | --- |
| Mineral Filler | 25–65 | 35–60 |
| Elastomer | 2–15 | 7–12 |
| Asphalt | 2–20 | 4–16 |
| Polymeric Modifier(s) | 20–60 | 30–50 |
| Foaming Agent | 0.5–5 | 0.5–3 |

The sheet materials of this invention include mineral fillers and elastomer dispersed in a binder. Mineral fillers included in sheet materials of this invention may be one or more of the various finely divided inorganic materials such as ground limestone, preferably a dolomitic limestone, whiting, silica, kiln dust, barytes, calcium carbonate, clay, slate and mica among others. Fillers having particle sizes so that about 80% will pass a 200 mesh screen and none will be held on a 35 mesh screen have been suitably employed in the practice of the present invention.

Rubber-like elastomers useful in the sound deadening sheet material composition may be natural rubber, synthetic polymer or copolymer rubbers, reclaim rubber or mixtures of such rubbers. Suitable synthetic rubbers include styrene-butadiene copolymer synthetic rubbers, butadiene-styrene block copolymers, butyl rubber, polyisobutylene, ethylene-propylene copolymers (EPM), ethylene-propylene-diene terpolymers (EPDM) and mixtures of these. A preferred range of Mooney values is from about 20 to about 60.

In a preferred embodiment of the invention, the elastomer(s) include a combination of reclaim rubber(s) and synthetic rubber(s) with the reclaim rubber(s) preferably present in the greater proportion. For example a particularly preferred combination of elastomers involves a reclaim rubber in combination with ethylene propylene copolymers (EPM) and/or ethylene-propylene-diene copolymers (EPDM).

As can be seen from Table I, the dispersed ingredients (filler and elastomer) can represent from about 30 to about 80 percent by weight of the sheet material composition but preferred sheet materials are those in which the dispersed ingredients represent from about 40 to about 70 percent by weight.

The asphalts include in the binder systems of the novel sheet materials are those which can wet the filler material for effective dispersion in the binder. The asphalts may be either natural asphalt or residue from the distillation of petroleum or mixtures of these and are commercially available in penetration values up to about 300 as determined by ASTM method D-5-73 at 77° F. Softening points (Ball and Ring), as determined by ASTM method D-36-70 should be in the range of from about 60° F. to about 110° F., preferably from about 60° F. to about 80° F.

A variety of polymeric modifiers may be used in combination with the asphalts to provide sound deadening sheet materials of the invention. Essentially, a suitable polymeric modifier is an asphaltic compatible polymer(s) which provides binder systems presenting a degree of cohesiveness (or melt viscosity characteristics) at elevated temperatures having the requisite softening and restrained flow characteristics, but additionally having the capability for expansion to provide an internal cellular structure having a desirable degree of functional integrity.

Preferred polymeric modifiers include polyolefins such as polyethylene, polypropylene, polybutene among others as well as copolymers of such polyolefins. Because cost is an important factor in sound deadening sheet materials, polyethylene is preferred. Preferred copolymers are asphaltic compatable ethylene copolymers containing from about 40% to about 98% preferably from about 60% to about 90% by weight ethylene with from about 60% to about 2% preferably from about 40% to about 10% by weight of a mono-unsaturated polymerizable compound such as a lower alkyl, i.e. 6 carbon atoms, acrylate, methacrylate, ethyl acrylate or ethyl acetate.

Hydrocarbon oil or resin is preferably included as a polymeric modifier in relatively small percentages in the preferred binder systems to improve mixing of the asphalt with the mineral filler. For example, it has been found that the addition of gilsonite to the binder composition materially improves the breaking strength and tear strength of the sound deadening sheet material. Gilsonite is a natural hard thermoplastic hydrocarbon resin having a melting point of from about 130° C. to about 140° C. and a penetration at 77° F. (ASTM D-5-52) of less than one.

The sheet materials of the present invention include a foaming (or blowing) agent effectively dispersed in the binder system. As those in the art know, foaming agents can be solid, liquid or gaseous substances which act as a source of gas which can produce an internal cellular structure in a polymeric mass. Foaming agents known to the art include physical foaming agents and chemical foaming or blowing agents. Chemical foaming agents are generally solid inorganic salts or organic materials which decompose at specific temperatures and generate a volume of gas sufficient to provide an internal cellular structure. In the practice of the present invention, chemical foaming agents and particularly chemical foaming agents of the organic type are especially preferred.

In sound deadening sheet materials of this invention for use in automotive applications, the included foaming agent is one having a decomposition temperature coincident with the temperatures of the heating ovens. In present automotive assembly line operations, the temperature of these ovens range between about 140° C. to about 200° C. or higher and oven residence times of about 40 minutes are usually involved. Accordingly, automotive sound deadening sheet materials of this invention preferably include organic foaming agents having decomposition temperatures between about 140° C. to about 200° C. or higher. Such foaming agents are commercially available and include sulfonyl hydrazide types such as 4,4'oxy bis (benzenesulfonylhydrazide), azodicarbonamide types such as 1,1' azobisformamide and modified azodicarbonamide types. The sheet materials of this invention may be expanded or foamed by using foaming agents or foaming systems which can be activated at temperatures below 140° C. or above 200° C. For example, foaming agents such as those mentioned above may be used in combination with known catalysts for foaming agents such as amines (urea) or glycols (diethylene glycol).

In the preferred sheet materials of this invention, the ingredients and respective amounts are selected to provide sheet material products having a minimum breaking tensile strength prior to foaming of 0.15 lb/mil thickness/inch width and a minimum tear strength prior to foaming of 50 lbs/in. thickness. The breaking strength is determined according to ASTM D 461 while the tear strength is determined according to ASTM D 624 Die "C". Additionally, preferred sheet materials of this invention have densities prior to expansion or foaming between about 70 to about 90 lbs/ft$^3$.

Representative particularly preferred sound deadening sheet material compositions are set forth in Table II below:

TABLE II

| Ingredient | % by weight of sheet material | |
|---|---|---|
| | Range | Preferred |
| Inorganic Filler (Limestone) | 35–60 | 40–55 |
| Reclaim Rubber(s) (SBR) | 4–8 | 5–7 |
| Synthetic elastomers (EPM and/or EPDM rubbers) | 2–5 | 3–4 |
| Asphalt | 4–10 | 5–9 |
| Polyethylene and/or Ethylene acrylate copolymer | 30–50 | 35–45 |
| Gilsonite | 1–5 | 1.5–3.5 |
| Foaming Agent | 0.5–3 | 0.75–2.00 |

The above-described particularly preferred sheet materials may be compounded in any conventional manner as by mixing together the asphalt, polymers modifier(s), gilsonite, elastomer(s) and foaming agent in a high shear mixer (Banbury) and then adding the mineral filler to the mixture and mixing to uniformity at temperatures which will not cause activation of the blowing agent. The mixture is then formed into a sheet by calendar rolls or other suitable device. For use as a sound deadener for metal floor pans for automobiles, sheets are preferably from about 0.035 inch to about 0.150 inch in thickness.

Sheet materials presented by way of this invention have the capability of softening into conformity with the contours of the metal sheet coupled with the requisite restrained flow characteristics as required in the test described above. However, sheet materials of this invention also have the capability of being expanded internally to provide a cellular structure of a high degree of functional integrity. In other words the sheet materials of this invention are mastic-like and pliable at room temperature. At elevated temperatures however, they have a cohesiveness—or melt viscosity characteristics—which provide the requisite softening capability, the requisite flow resistant capability, the requisite adherent capability and the capability of being expanded to provide a strong, compressible and resilient cellular structure providing a high degree of functional integrity. The combination of these capabilities provide sound deadening sheet materials for the automotive industry which permit a weight reduction of about 30 percent without affecting the distinct combination of performance characteristics established by the industry for such sheet materials.

The following Examples are given to aid in more fully understanding the invention and more fully appreciating the manners of making and using the invention. It is to be understood that the invention is not restricted to the particular procedures, materials or the like of the Examples.

The sound deadener sheet for use with an automobile floor pan is merely laid on the upper surface of the floor pan and is required to soften into conformity with the contour of the floor pan during the heating used in finishing the automobile body, but must also not be softened to a condition in which it runs excessively so as to lose its uniformity or to run or flow beyond desired area limits.

As shown in FIG. 1, tests for acceptance of sound deadener sheet material involve laying a 2×10" strip 10 of the sound deadener sheet across a metal sheet 12 contoured as shown in FIG. 1 and heating the assembly to 320° F. for one-half hour. The metal sheet 12 has a flat, horizontally disposed first section 14, a section 16 extending downward at right angles to the first section and a further horizontally disposed section 18. The section 18 is formed with small grooves 20. It is required that after the heating, the strip 10 have softened and sagged from its original position and flat shape shown in broken lines in FIG. 1 into conformity not only with the downwardly angled section 16 but also with the small grooves 20 so that there is not more than a 1/16" gap between the strip 10 and the contoured metal section 12 at any point.

A further test to establish that the sheet does not flow or run excessively involves disposing a 2×6" strip 22 on the flat portion 14 of the contoured metal surface with a portion of the strip, as shown in broken lines in FIG. 1, extending beyond the edge that flat portion 14 by an amount which would bring the edge 26 against an upper score mark 28, on the downwardly extending portion 30 when the strip 22 has bent downwardly into engagement with the vertical portion 16 of the metal sheet 12. It is required that on heating the sample to 400° F. the downwardly bent portion 30 of the strip 22 must not flow more than ⅜" in one hour, i.e. must not have flowed down to the lower score mark 32 on the vertical portion 16 of the metal surface. Additional requirements are that the sheet have a breaking tensile strength of at least 0.15 pound per mil thickness/inch width.

EXAMPLE 1

The following is a formula of a sound deadening sheet of the present invention for use in connection with an automobile floor panel section.

| | |
|---|---|
| Finely divided dolomitic limestone | 46 |
| Ethylene propylene rubber | 3.3 |
| Reclaim rubber[2] | 5.7 |
| Asphalt[3] | 5.7 |
| Ethylene - ethyl acrylate copolymer[4] | 36.0 |
| Gilsonite | 1.8 |
| ZnO | 0.5 |
| Foaming agent[5] | 1.0 |

[1]An ethylene propylene copolymer sold by Enjay Chemical Company under the Trademark VISTALON 404.
[2]A whole tire reclaim rubber.
[3]A commercially available asphalt known as 22 L and sold by the Pioneer Division of Witco Chemical Company and having the following properties.
Saybolt Viscosity - 900–150 sec. at 150°   ASTM D 88-56
Ball and Ring Softening Point - 60–80° F.   ASTM D 36-70
Specific Gravity at 60° F. 0.96–0.98   ASTM D 70-72
Solubility in CS$_2$ 99.5 + %   ASTM D 2042-66
Solubility in Trichloroethylene 99.5 + %   ASTM D 2042-66
[4]An ethylene-ethyl acrylate copolymer sold by Union Carbide under the designation CO-MER DPDA - 1969 Resin.
[5]A p,p'-oxybis-(benzenesulfonyl hydrazide) foaming agent sold by Naugatuck Chemicals under the Trademark CELOGEN ® OT.

All of the ingredients except the ethylene ethylacrylate copolymer and limestone were introduced to a laboratory sized internal mixer sold under the Trademark BANBURY (Model 00) and worked together for one minute. The copolymer and limestone were then added and all ingredients were worked together for two minutes or until the batch temperature reached 250° F. The mixture was discharged from the mixer and sheeted out between rolls of a calendar to a thickness of 0.060"±0.005".

TEXT DATA

All of the following test values are based on sheet materials conditioned in a controlled atmosphere of 23° C.±2° C. and 50%±5% relative humidity for at least 24 hours prior to testing.

Flexibility—Room Temperature (23° C.+2° C.)

A 2"×6" sample of the above prepared sheet material was bent 180° slowly around a 1" mandrel with either side up. No cracking was detected.

Cold Temperature Flexibility −10° C.+2° C.

A 2"×6" sample of sheet material conditioned at −10° C.±2° C. for four hours was bent 180° slowly around a temperature conditioned 2" mandrel with either side up. No cracking was detected.

Bond Adhesion

A 2"×10" sample of sheet material was positioned on a flat metal test panel and the panel placed in an oven heated to 168° C.±2° C. for 30 minutes.

Attempts to remove the foamed sheet material from the metal test panel resulted in cohesive failure.

Heat Stability

A 6"×6" sample of sheet material was positioned on a flat metal test panel and the panel placed in an oven heated to 168° C.±2° C. for 40 minutes.

No evidence of degredation, embrittlement or excessive blistering of the foamed sheet material was detected.

Foamability

A 6"×6" sample of sheet material (0.060" thick) was placed on one corner of a 12"×12" metal test panel and the test panel was placed in an oven heated to 168° C.±2° C. for 40 minutes.

Measurements of foam height 2" inwardly from any edge of the foamed material was 0.120" or greater. The foamed sheet was strong, and had excellent performance characteristics in terms of compressibility and resiliency.

A 2"×10" sample of sheet material was placed on a metal test panel as shown in the Figure and the test panel was placed in an oven heated to 168° C.±2° C. for 30 minutes.

The foamed sheet material conformed to all contours of the test panel as illustrated in FIG. 1 and successfully passed the restricted flow requirements.

Blocking

The sheet material exhibited no blocking under normal handling and storage conditions.

Breaking Tensile Strength—before foaming—greater than 0.15 lb/mil. thickness/inch width ASTM D 461.

Tear strength—before foaming—greater than 50 lb/in. thickness. ASTM D 624 Die "C".

Density prior to foaming—80 lbs/ft

EXAMPLE 2

The following is a formula of another sound deadening sheet material of the present invention.

| | % by weight |
|---|---|
| Finely divided dolomitic limestone | 44.5 |
| Ethylene propylene rubber | 3.0 |

-continued

| | % by weight |
|---|---|
| Reclaim rubber | 6.0 |
| Asphalt | 6.0 |
| Polyethylene[7] | 37.5 |
| Gilsonite | 1.5 |
| ZnO | 0.5 |
| Foaming Agent | 1.0 |

[7]A polyethylene sold by Union Carbide under the designation DNDA 4140.

The ethylene propylene rubber, reclaim rubber, asphalt and foaming agent were the same as in Example 1.

Sheet material of the above formula was prepared as in Example 1, conditioned as in Example 1 and subjected to all of the tests of Example 1. The sheet material successfully passed all of the tests with substantially the same results as obtained for the sheet material of Example 1.

EXAMPLE 3

The following is a formula of still another sound deadening sheet material of the present invention.

| | % by weight |
|---|---|
| Finely divided dolometic limestone | 50 |
| Ethylene propylene rubber | 1.2 |
| Ethylene propylene diene rubber[8] | 5.3 |
| Asphalt | 5.7 |
| Ethylene - ethyl acrylate copolymer | 18.7 |
| Polyethylene | 16.7 |
| Gilsonite | 1.5 |
| ZnO | 0.5 |
| Foaming Agent[9] | 1.0 |

[8]A terpolymer sold by E. I. DuPont de Nemours under the trademark NORDEL 2744.
[9]An azodicarbonamide foaming agent sold by Olin Chemicals Tradename KEMPORE 200.

The ethylene propylene rubber, asphalt, ethylene—ethyl acrylate copolymer were the same as in Example 1. The polyethylene was the same as in Example 2.

Sheet material of the above formula was prepared as in Example 1, conditioned as in Example 1 and subjected to all the tests of Example 1. The sheet material successfully passed all of the tests with substantially the same results as obtained for the sheet materials of Example 1.

EXAMPLE 4

The following is a formula of still another vibration damping sheet material of this invention.

| | % by weight |
|---|---|
| Finely divided dolomitic limestone | 38 |
| Ethylene propylene rubber | 2.7 |
| Reclaim rubber | 4.5 |
| Asphalt | 4.5 |
| Ethylene - ethyl acrylate copolymer | 47 |
| Gilsonite | 1.5 |
| ZnO | 0.3 |
| Foaming Agent[10] | 1.5 |

[10]The foaming agent includes 1.0 percent by weight of the sheet material composition of the p,p'-oxybis (benzenesulfonyl hydrazide) foaming agent of Example 1 and 0.5 percent by weight of the sheet material of diethylene glycol.

The ethylene propylene rubber, asphalt and ethylene—ethyl acrylate copolymer were the same as in Example 1.

Sheet material of the above formula was prepared as in Example 1, conditioned as in Example 1 and subjected to all the tests of Example 1 with the exception of the described foamability test. The sheet material successfully passed all of the tests with substantially the same results as obtained for the sheet materials of Example 1.

The sheet material of this Example was subjected to the following foamability test:

Foamability

A 6"×6" sample of sheet material (0.060" thick) was placed on one corner of a metal test panel and the test panel was placed in an oven heated at 135° C. for 8 minutes.

Measurements of foam height 2" in from any edge of the foamed material was 0.120" or greater. The foamed sheet was strong and had excellent performance characteristics in terms of compressibility and resiliency.

As can be seen from the above, the expansion or foaming was conducted at lower temperatures and shorter times than in the previous Examples. This sheet material was particularly useful as a sound deadening sheet material for an automotive roof section.

Substantially the same results were obtained for a sheet material having substantially the same composition as the above formula, but using 0.5 percent by weight of the sheet material composition of urea rather than diethylene glycol in combination with the foaming agent.

Figure 2:
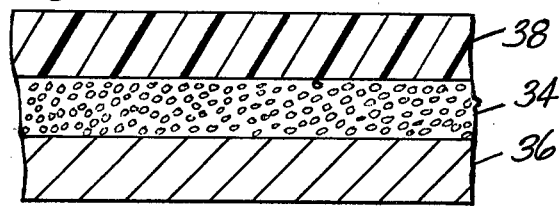
FIG. 2 is a cross-sectional view of a laminate including a foamed sheet material of the invention.

Especially improved sound deadening performance characteristics can be obtained by using a foamable sheet material of this invention in combination with commercially available, non-foamable sound deadening sheet materials. FIG. 2 illustrates such a combination where a foamable sheet material 34 of this invention is bonded to metal substrate 36 and non-foamable sheet material 38 is bonded to sheet material 34. Non-foamable sheet material 38 is preferably a sheet material of the type described in U.S. Pat. No. 4,133,932 mentioned before. Preferably, sheet materials 34 and 38 are bonded together and in use, the bonded product is placed on an automotive metal panel section with sheet material 34 communicating with the metal surface.

In the description so far, the use of the sound deadening sheet in combination with automotive floor panel sections has been emphasized. However, it should be understood that the sheet materials can also be used in combination with other automotive panel sections such as door, roof, hood or other body sections to isolate adjacent panel sections to prevent flutter of unsupported sections. When used in combination with such sections they may be bonded to the section surface such as by pressure sensitive adhesives to hold the sheet materials in place until foamed in the ovens.

In addition to automotive applications it is important to understand that the sheet materials provide relatively inexpensive foams having a high degree of functional integrity. Accordingly, the sheet materials can be used in various other applications where the softening and flow characteristics of the sheet material are not of such importance as in automotive applications. These other applications can include sound deadening as well as non-sound deadening applications. When used in such other applications, the sheet materials provide laminates in which the foamed sheet material is bonded to the surface of one or more substrates. The use of the sheet materials in such other applications is shown in FIGS. 3 and 4.

Figure 3:
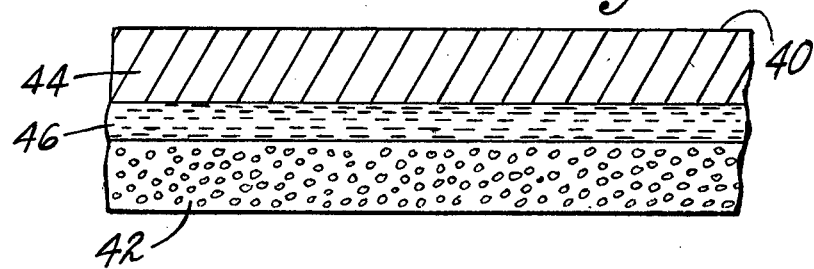
FIGS. 3 and 4 are cross-sectional views of other laminates including a foamed sheet material of the invention.

The laminate shown generally as 40 in FIG. 3 includes a foamed sheet material of the invention 42 bonded to the surface of a substrate 44 by way of adhesive layer 46. It should be understood that substrate 44 may be applied to sheet material 42 before or after foaming and an adhesive layer 46 is not always necessary. Effective bonding can oftentimes be directly achieved between sheet material 42 and substrate 44 particularly for example if substrate 44 is a metal. or if substrate 44 is a heat fusible material. Substrate 44 can be of a wide variety of materials such as metals, for example, a sheet of aluminum foil or plastic materials, for example, such as a vinyl or polyester sheet material. Other suitable substrate materials include wood, paper, fabric and glass or other vitrous materials among others. Substrate 44 is shown as a single sheet material, but may carry one or more substrates or carry other materials such as fibers. For example, substrate 44 may be the base of a rug and laminate 40 including foamed sheet material 42 carrying the rug can be bonded to an automotive floor surface.

Figure 4:
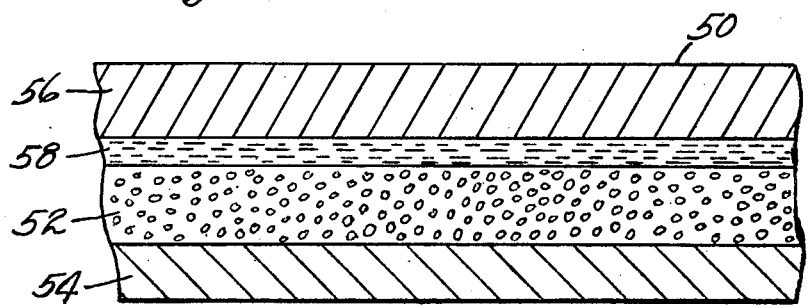

The laminate shown generally as 50 in FIG. 4 includes a foamed sheet material 52 of the invention positioned between and bonded to the surfaces of substrates 54 and 56. Sheet material 52 may be bonded directly to one or both substrates as shown in the bond between sheet material 52 and substrate 54. Alternatively, sheet material 52 may be bonded to one or both substrates by way of an adhesive layer 58 as shown in the bond between sheet material 52 and substrate 56. Substrates 54 and 56 can be any of the materials mentioned above in the description of FIG. 2 or others. Substrates 54 and 56 can be the same or different materials depending upon the designed application for laminate 50. For example, substrate 54 may be a sheet of aluminum foil while substrate 56 may be a plastic sheet material impermeable to moisture. The resultant laminate 50 provides a foamed sheet material positioned between and bonded to an aluminum foil sheet material on one surface and a plastic sheet material providing a moisture impermeable barrier layer on the other surfaces.

Various modifications may be made to the above description relating to embodiments of the invention without departing from the spirit and scope of the invention defined in the claims. For example, in the description so far, the sheet material is thermoplastic in nature both before and after foaming. In other words, the sheet material can be resoftened and can flow—even excessively—if subjected to sufficiently high temperatures for sufficient times. Normally however, particularly in automotive sound deadening applications, the sheet material is never again subjected to the temperatures encountered in paint drying ovens. For applications in which higher temperatures for extended times may be encountered either at or after expansion of the sheet material, the thermoplastic nature of the sheet materials of this invention can be adjusted. The desired degree of adjustment can be achieved by using agents for cross-linking or curing the sheet material composition. For example, peroxides may be included in the sheet materials in varying amounts to provide a preselected degree of cure for the composition. Normally, the curing agent selected will be one having an activation temperature at or near the activation temperature of the blowing agent.

I claim:

1. A mastic material softenable into conformnity and adhesive engagement with a contoured metal surface but resistant to flow and comprising from about 25 to about 65 percent by weight of the mastic material of mineral filler, from about 2 to about 15 percent by weight of an elastomer, from about 2 to about 20 percent by weight of asphalt from about 20 to about 60 percent by weight of a polymeric modifier and, an effective amount of a heat activatable foaming agent.

2. A mastic material of claim 1 where said polymeric modifier includes from about 1 to about 5 percent by weight gilsonite.

3. A mastic material of claim 1 comprising from about 35 to about 60 percent by weight of mineral filler, from about 7 to about 12 percent by weight elastomer, from about 4 to about 16 percent by weight asphalt, from about 30 to about 50 percent by weight of polymeric modifier including from about 1.5 to about 3.5 percent by weight gilsonite and from about 0.5 to about 3 percent by weight of a heat activatable foaming agent.

4. A mastic material of claim 1 or claim 2 or claim 3 where said elastomer includes a reclaim rubber and a rubber selected from the group consisting of ethylene—propylene rubbers, ethylene propylene diene rubbers or mixtures of these.

5. A mastic material of claim 1 or claim 2 or claim 3 where said polymeric modifier includes a polyolefin polymer.

6. A mastic material of claim 1 or claim 2 or claim 3 where said polymeric modifier includes an ethylene polymer.

7. A mastic material of claim 1 or claim 2 or claim 3 where said polymeric modifier includes an ethylene polymer selected from the group consisting of polyethylene, ethylene ethyl acrylate or mixtures of these.

8. A mastic material of claim 1 or claim 2 or claim 3 where said foaming agent has a decomposition temperature between about 140° C. to about 200° C.

9. A mastic material of claim 1 or claim 2 or claim 3 where said mineral filler includes a finely divided dolomitic limestone.

10. A mastic material softenable by heat into conformity and adhesive engagement with a contoured metal surface, but resistant to flow and including from about 35 to about 60 percent by weight of a finely divided limestone, from about 4 to about 8 percent by weight reclaim rubber, from about 2 to about 5 percent by weight of a rubber selected from the group consisting of ethylene propylene rubbers, ethylene propylene diene rubbers or mixtures of these, from about 4 to about 10 percent by weight of asphalt, from about 30 to about 50 percent by weight of an ethylene polymer selected from the group consisting of polyethylene, ethylene ethyl acrylate or mixtures of these, from about 1 to about 5 percent by weight gilsonite and an effective amount of a foaming agent having a decomposition temperature between about 140° C. to about 200° C.

11. A mastic material softenable by heat into conformity and adhesive engagement with a contoured metal surface, but resistant to flow and including from about 35 to about 55 percent by weight of a finely divided limestone, from about 5 to about 7 percent by weight reclaim rubber, from about 3 to 4 percent by weight of a rubber selected from the group consisting of ethylene propylene rubbers, ethylene propylene diene rubbers or mixtures of these, from about 5 to about 9 percent by weight of asphalt, from about 35 to about 45 percent by weight of an ethylene polymer selected from the group consisting of polyethylene, ethylene ethyl acrylate or mixtures of these, from about 1.5 to about 3 percent by weight gilsonite and an effective amount of a foaming agent having a decomposition temperature between about 140° C. to about 200° C.

* * * * *